March 3, 1931.     B. H. TINGLEY     1,794,808
TAXIMETER
Filed Sept. 12, 1927     7 Sheets-Sheet 1

INVENTOR.
BRUCE H. TINGLEY.
HW Baker
ATTORNEY.

March 3, 1931.  B. H. TINGLEY  1,794,808
TAXIMETER
Filed Sept. 12, 1927   7 Sheets-Sheet 3

INVENTOR.
BRUCE H. TINGLEY.
H.W. Baker
ATTORNEY.

March 3, 1931. B. H. TINGLEY 1,794,808
TAXIMETER
Filed Sept. 12, 1927 7 Sheets-Sheet 4

INVENTOR.
BRUCE H. TINGLEY.
H. W. Baker
ATTORNEY.

March 3, 1931.  B. H. TINGLEY  1,794,808
TAXIMETER
Filed Sept. 12, 1927  7 Sheets-Sheet 5

INVENTOR.
BRUCE H. TINGLEY.
ATTORNEY.

March 3, 1931.  B. H. TINGLEY  1,794,808
TAXIMETER
Filed Sept. 12, 1927  7 Sheets-Sheet 6

INVENTOR.
BRUCE H. TINGLEY.
H. W. Baker
ATTORNEY.

Patented Mar. 3, 1931

1,794,808

UNITED STATES PATENT OFFICE

BRUCE H. TINGLEY, OF DAYTON, OHIO, ASSIGNOR TO OHMER FARE REGISTER COMPANY, OF DAYTON, OHIO

TAXIMETER

Application filed September 12, 1927. Serial No. 218,984.

This invention relates to an improved form of taximeter. Among the advantages which might be mentioned are the simple construction, cheapness to manufacture, durability and accuracy.

One of the objects of the invention is to incorporate in a taximeter a novel gear box whereby the gear ratio may be readily changed to any other gear ratio.

Another object of the invention is to provide a mechanism to totalize the waiting time that the vehicle is employed.

Numerous other advantages will be noted in the following specification in which

Fig. 14 is a detail view of the actuating means for the units wheel of the fare drums.

Fig. 18 is a detail sectional view of the cam actuating shaft on the line 18—18 of Fig. 9.

Driving connections to the vehicle

The flexible shaft 1 driven by a moving part of the vehicle is connected to a one-way clutch member 2 which drives a complementary clutch member 3 connected to a gear 4 by means of a collar 5. The gear 4 is rotatably mounted on a stud shaft 15 mounted in the base plate 6 of the taximeter. The gear 4 meshes with the gear 7 mounted on a shaft 8 carried by a pivoted arm 9 held in position by means of a bolt 10 secured to the base plate of the taximeter. A gear 11 mounted on the shaft 8 is operatively connected to the gear 7 and drives a gear 12 mounted on a shaft 13 which carries a screw 14. Each of the gears 4, 7, 11 and 12 may be removed and other gears of different sizes substituted therefor. The pivoted arm 9 provides a ready means to take care of the change of size of the gear. When gears of different sizes are to be substituted the bolt 10 would be loosened so that the arm 9 could be shifted into its new position and the bolt would thereafter be tightened. The gear box housing 17 is secured to the base plate 6 so as to completely house the gears mounted below the base plate 6.

The shaft 13 is journaled in bearings 16 secured to the sidewall 45 which is in turn secured to the base plate 6. Above the base plate 6 and below the lowermost bearing 16 a ratchet 18 is secured to the shaft 13 and a spring-pressed pawl 19 is mounted on a pin 20 to engage the ratchet 18 and prevent the shaft 13 from rotating rearwardly. If the taxicab is driven backwards the clutch members 2 and 3 over-ride each other. The screw 14 meshes with and drives the screw gear 21 rigidly secured to a shaft 22 hereinafter referred to as the road shaft because it receives its movement from the distance that the taxicab is driven. The shaft 22 has splined thereon two clutch members 23 and 24 having a collar 25 connecting the same, which collar is of smaller circumference than the clutch members providing a circular channel whereby the clutch members may be shifted as hereinafter described. Loosely mounted on the road shaft 22 is a clutch member 26 connected to a gear 27 by means of tie bars 28.

If the clutch member 23 is shifted so as to engage the clutch member 26 the gear 27 will be operated. A clutch member 29 is loosely mounted on the road shaft 22 and is connected to a gear 30 by means of tie bars 31. When the clutch member 24 is shifted so as to engage the clutch member 29 the gear 30 will be operated. The gear 27 is smaller than the gear 30. The gear 30 drives a gear 32 on the cam shaft 33 while the gear 27 drives a gear 34 on the cam shaft 33. The gear 32 is secured to the shaft 33 by means of a collar 35 and pin 36 while the gear 34 is secured to the said shaft by means of a collar 37 and pin 38. The clutch members 23 and 24 are so spaced from the clutch members 26 and 29 that it is impossible for all of said clutch members to be engaged at the same time. It is, therefore, obvious that the cam shaft may be driven at either of two speeds depending upon which one of the clutch members is engaged. It is furthermore obvious that whenever the vehicle is operated in a forward direction the cam shaft 33 will be rotated.

Drive from the clock mechanism

Figure 6:
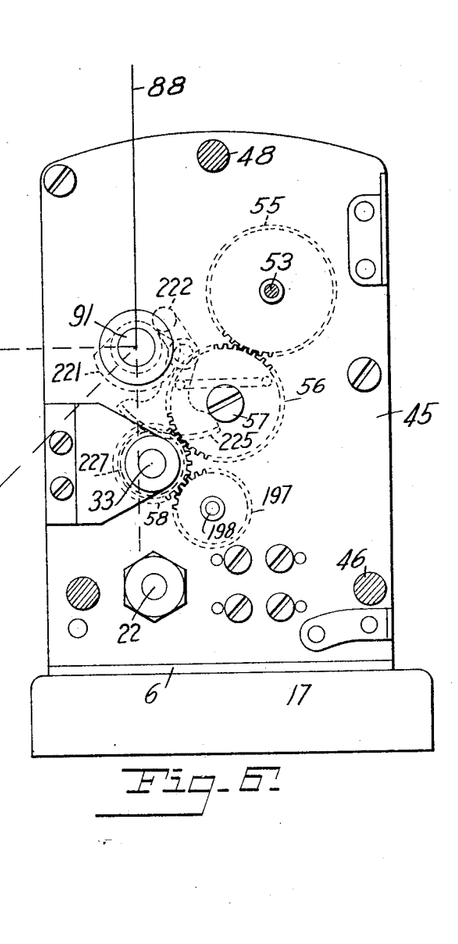
Fig. 6 is an elevational view on the line 6—6 of Fig. 1 looking toward the right.
Figure 7:
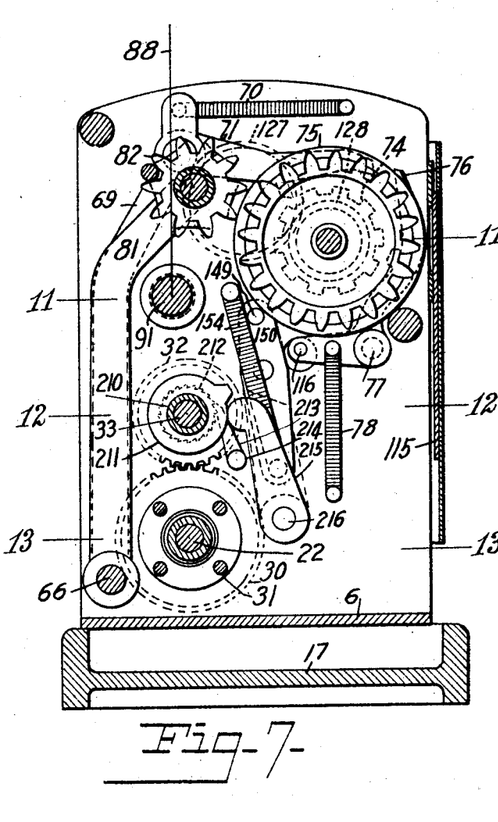
Fig. 7 is an elevational view on the line 7—7 of Fig. 2 looking toward the left.
Figure 8:
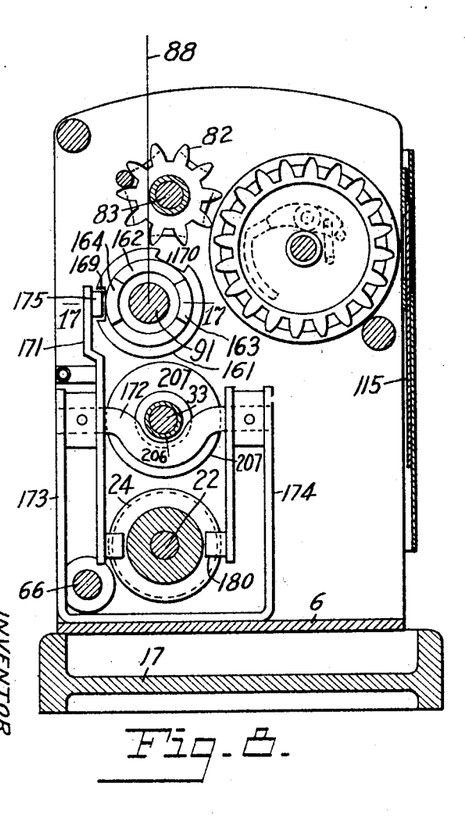
Fig. 8 is an elevational view on the line 8—8 of Fig. 2 looking toward the left.

The clock 40 is a removable unit and consists of a clock casing comprising an outer wall 41, an inner wall 42 and a wall 43. The walls 42 and 41 are connected by tie bars 44 and the wall 43 is connected to the wall 41 by similar tie bars. The casing is removably secured to a wall 45 by means of studs 46 and 47 which receives screws 48 in the outer ends thereof, which screws pass through apertures in the walls 42 and 43 respectively. The clock mechanism housed within the clock casing is conventional and consists of a drum 49 housing a spring (not shown), which drum carries a gear 50 operatively connected with an escapement mechanism 51. The gear 50 also drives through a train of gearing (not shown) a shaft 52 which is operatively connected with a shaft 53 by means of a universal joint 54. The object of the universal joint is to take care of any misalignment of the shafts 52 and 53, the shaft 52 being carried by the clock casing and the shaft 53 being journaled in the wall 45 of the taximeter. The shaft 53 carries a gear 55 (Figs. 2 and 6) which drives a gear 56 mounted on a stud shaft 57 carried by the sidewall 45. The gear 56 meshes with and drives a pinion 58 rotatably mounted on the shaft 33. The pinion 58 is provided with a pawl 59 (Fig. 18) which engages a ratchet 60 mounted on a collar 61. A jumping cam 62 is rigidly secured to said collar 61 or is formed integral therewith and a ratchet 63 is likewise secured thereto. The teeth on the ratchet 60 extend in the same direction as the teeth on the ratchet 63. A pawl 64 is carried by the gear 34 so as to drive the cam 62 from a moving part of the vehicle while the ratchet 60 drives the cam 62 from the clock mechanism.

The gear ratio in the clock driving mechanism is so related to the gear ratio in the mechanism driving from a moving part of the vehicle that the clock mechanism is effective to drive the jumping cam 62 when the vehicle is standing still and when the vehicle is moving below a certain predetermined speed such as six miles an hour, for instance, but when the vehicle exceeds such a speed the pawl 59 simply over-runs the ratchet 60 and the effective driving connection is through the gear 34. Vice versa, when the speed is decreased the pawl 64 over-runs the teeth of the ratchet 63 and the pawl 59 engages the ratchet 60 and drives the cam 62.

Fare drum actuating means

Figures 9, 10, 11:
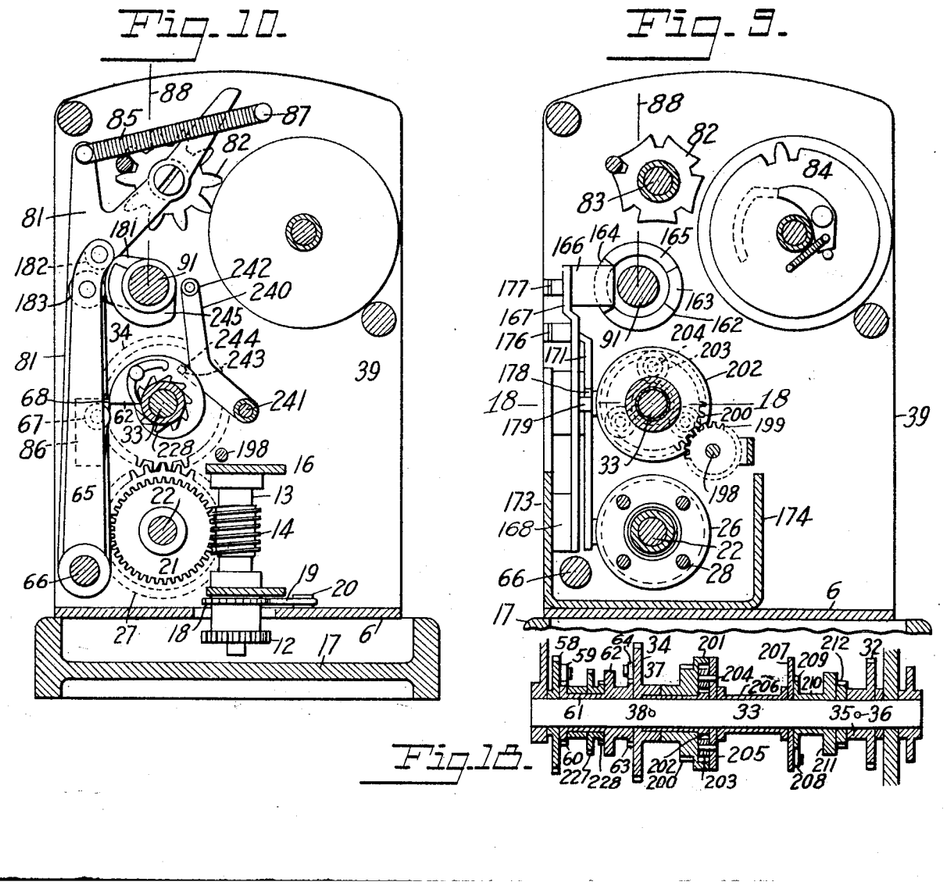
Fig. 9 is an elevational view on the line 9—9 of Fig. 2 looking toward the left.
Fig. 10 is an elevational view on the line 10—10 of Fig. 2 looking toward the left.
Fig. 11 is a plan view on the line 11—11 of Figs. 2 and 7.
Figures 11, 12, 17:
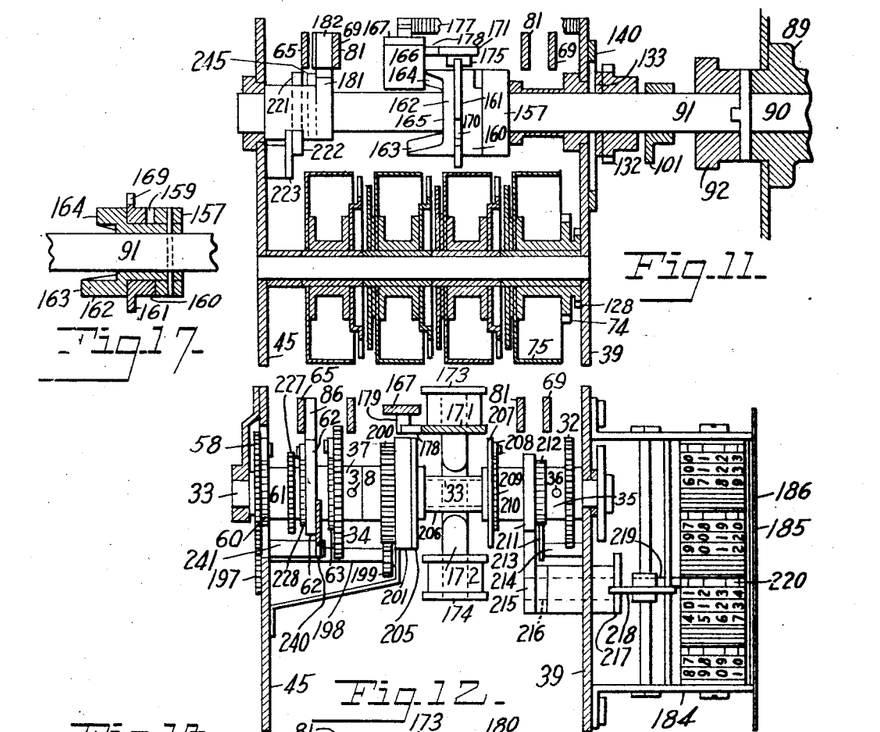
Fig. 12 is a plan view on the line 12—12 of Figs. 2 and 7.
Fig. 17 is a detail view of the clutch shifting cam on the line 17—17 of Fig. 8.
Figure 13:
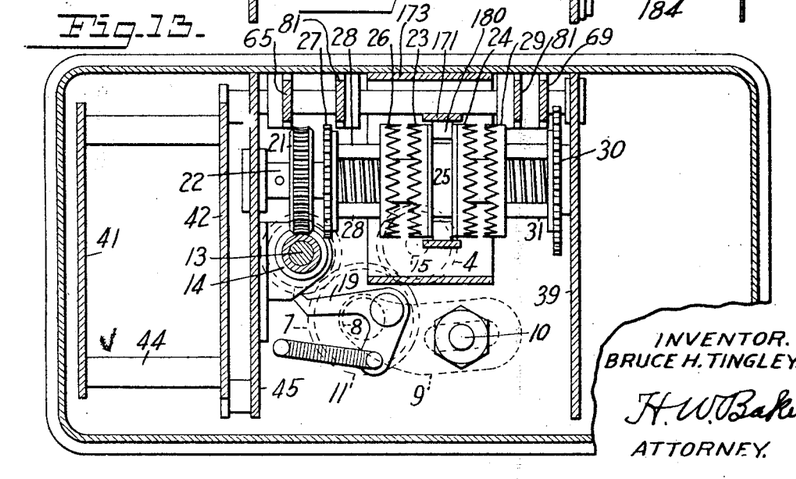
Fig. 13 is a plan view on the line 13—13 of Figs. 2 and 7.

The jumping cam 62 is, as before mentioned, driven by either a moving part of the vehicle or by the clock mechanism. As shown in Fig. 10, the jumping cam has only one lobe thereon, but obviously any number could be employed. The jumping cam actuates a lever 65 secured to a shaft 66 mounted in the walls 39 and 45 of the taximeter. The lever 65 is provided with a bearing block 86 and with a roller 67. The upper end of the bearing block 86 is slightly flattened as indicated at 68 so that the roller 67 engages the periphery of the cam 62 until the nose of the cam has passed beyond the roller, whereupon the flattened part 68 of the bearing block engages the cam. The roller decreases friction as the cam rotates and the only material friction between the lever 65 and the cam is after the roller 67 drops off the nose of the cam and the part 68 engages the cam. This insures the lever being actuated at the exactly correct interval. A lever 69 is secured to the shaft 66 so as to move with the lever 65. The lever 69 is pulled toward the cam by means of a spring 70 connected to the upper end of the lever 69 and to the sidewall 39. The lever 69 carries an actuating pawl 71 (Fig. 14) which passes through a guide plate 72 secured to the sidewall 39. The pawl 71 is provided with an inwardly and forwardly extending lug 73 which engages a ratchet 74 carried by the fare drum 75 of lowest denomination. A holding pawl 76 is pivoted on a stud pin 77 and a spring 78 tends to hold the lug 79 carried by the pawl 76 in engagement with the ratchet 74. The pawl 76 extends upwardly beyond the lug 79 and passes through an aperture in the guide plate 72. Its upper end extends in alignment with the forward end of the pawl 71. As the pawl 71 moves forwardly to actuate the ratchet 74 and the fare drum, its forward end engages the upper end of the pawl 76 and moves the lug 79 out of engagement with the ratchet 74 and the lug 73 then engages the ratchet 74, rotating it one-tenth of a revolution. Near the end of the forward movement of the pawl 71 its forward end has risen above the upper end of the pawl 76, it being raised by means of the guide plate 72 engaging the lower sloping surface of the pawl 71 as clearly shown in Fig. 14, so that the holding pawl 76 immediately re-engages the ratchet 74 holding it against further rotation. This upward movement of the pawl 71 likewise disengages the lug 73 from the ratchet 74. As the cam 62 continues its rotation, moving the pawl 71 rearwardly, the lug 73 overrides the teeth of the ratchet 74. A spring 80 connects the pawl 71 with the lever 69 which spring tends to hold the lug 73 in engagement with the teeth of the ratchet 74 until the guide plate 72 disengages the same.

Suitable transfer mechanism is carried by levers 81 mounted on the shaft 66. The transfer mechanism consists of the usual Geneva gears 82 rotatably mounted on the shaft 83, which Geneva gears 82 cooperate with Geneva gears 84 carried by the adjacent fare wheels. The transfer mechanism on the shaft 83 is normally urged toward the Geneva gears 84 by means of the spring 85 connecting the upper end of one of the levers 81 to a pin 87 on the sidewall 39. The pin 87 serves as a stop for the upper end of the lever 81 when the Geneva gears are brought into mesh as hereinafter described. Inasmuch as the transfer mechanism is conventional further description thereof is not deemed to be necessary.

Flag shaft mechanism

The flag 88 is mounted on a shaft 90 in a bearing 89 secured to the casing of the taximeter and at its inner ends forms a tongue and groove connection with the flag shaft 91. The flag, when in a vertical position extending above the flag shaft, indicates that the vehicle is for hire. When the flag is rotated rearwardly 90° it has reached the first tariff position. When it is in a vertical position below the flag shaft it is in second tariff position. When the driver has a passenger he rotates the flag in a counter-clockwise direction into its 90° position and when he discharges the passenger he continues the rotation of the flag to its 135° position and then returns it in a clockwise direction to vertical position to reset the mechanism as hereinafter described. If he secures a plurality of passengers he moves the flag in a counterclockwise direction for 180° or to a point where the flag is directly below the flag shaft. When the passengers are discharged he rotates the flag in a clockwise direction to its original position.

The flag shaft 91 is provided with a holding cam 92. This cam engages a bell crank lever 93 pivoted on a stud pin 94 carried by the sidewall 39. The lever 93 is provided with a nose 95 which engages notches in the cam 92. A spring 96 is connected to the other end of the bell crank lever 93 and to the wall 39, the spring holding the nose 95 in engagement with the cam at all times. The notches in the cam 92 are spaced apart at 90°, 45° and 45° respectively. When the flag is in the upper position the nose 95 engages the notch 97 and prevents the rotation of the flag until sufficient force has been expended to overcome the tension of the spring 96. As the flag is rotated from its "For hire" position to its first tariff position the nose 95 rides on the periphery of the cam until it reaches the notch 98 which positions and holds the flag in exactly the right position. If the flag is then rotated to its 135° position the nose 95 will lie in the notch 99 and when the flag is in its 180° position it will lie in the notch 100.

Figure 3:
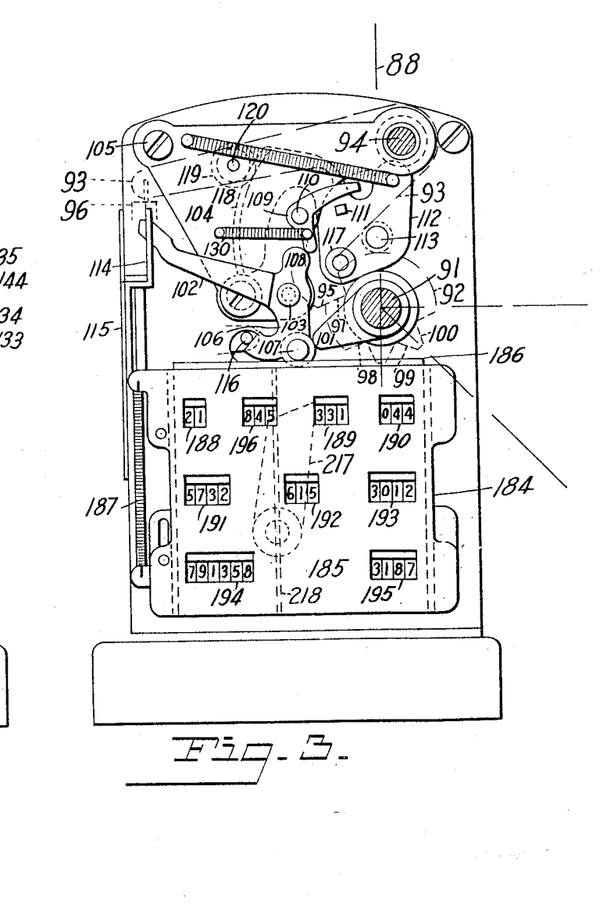
Fig. 3 is a right end elevational view taken on the line 3—3 of Fig. 1 looking to the left.

A short distance inwardly on the flag shaft from the cam 92 is a cam 101. When the flag is in its upper position the cam 101 is as shown in Fig. 3. As the flag is rotated clockwise as viewed in said figure it engages a bell crank lever 102 pivoted on a pin 103 carried by a plate 104 secured to the sidewall 39 by means of studs 105. The lever 102 has a downwardly extending arm 106 carrying a roller 107 which is engaged by the cam 101 as the flag moves to its first tariff position thereby rotating the lever 102 in a clockwise direction and an upwardly extending arm 108 of the lever 102 engages a bell crank lever 109 pivoted on a pin 110 carried by the plate 104 rotating the lever 109 in an anti-clockwise direction so as to release the other end thereof from a pin 111 carried by a resetting segment 112 mounted on a pin 113 carried by the wall 39. The forwardly extending arm of the lever 102 engages an arm 114 of a flash 115 so that as the flag is moved downwardly the flash 115 is likewise moved downwardly so as to permit the amount registered on the fare drums to be seen. As soon as the cam 101 passes beyond the roller 107 the parts are retained in position by means of the pin 111 engaging the lever 109 and the lever 109 in turn engaging the lever 102. When, however, the flag is moved to its "For hire" position or in an anti-clockwise direction as viewed in Fig. 3, the cam 101 rotates the lever 102 in a clockwise direction freeing the bell crank lever 109 from the pin 111, and simultaneously the forward end of the arm 106 engages a pin 116 (Figs. 3 and 14) disengaging the pawl 76 from the ratchet 74 so that the fare drums can be reset as hereinafter described.

Figures 1, 16:
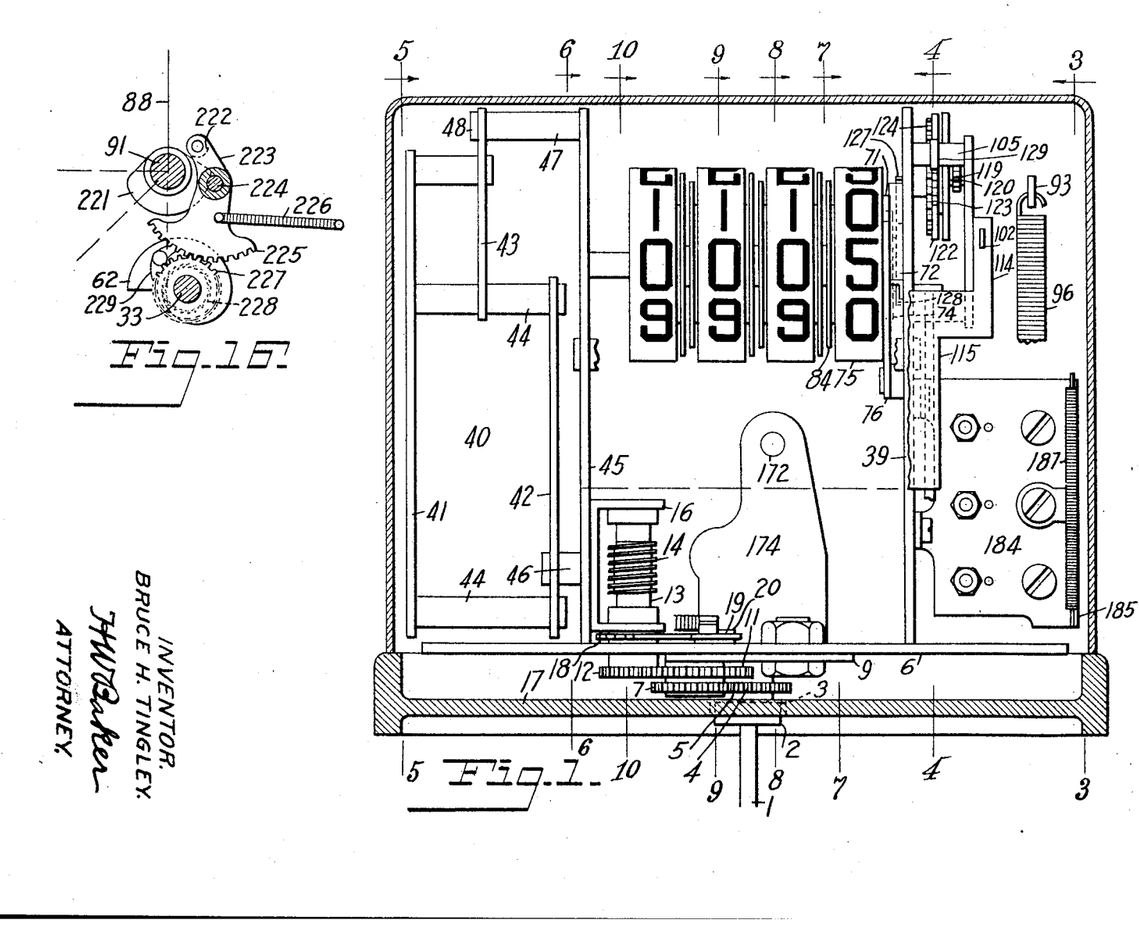
Fig. 1 is a front elevational view with the front plates removed.
Fig. 16 is a detail elevational view of the operating cam resetting mechanism.
Figures 1A, 2:
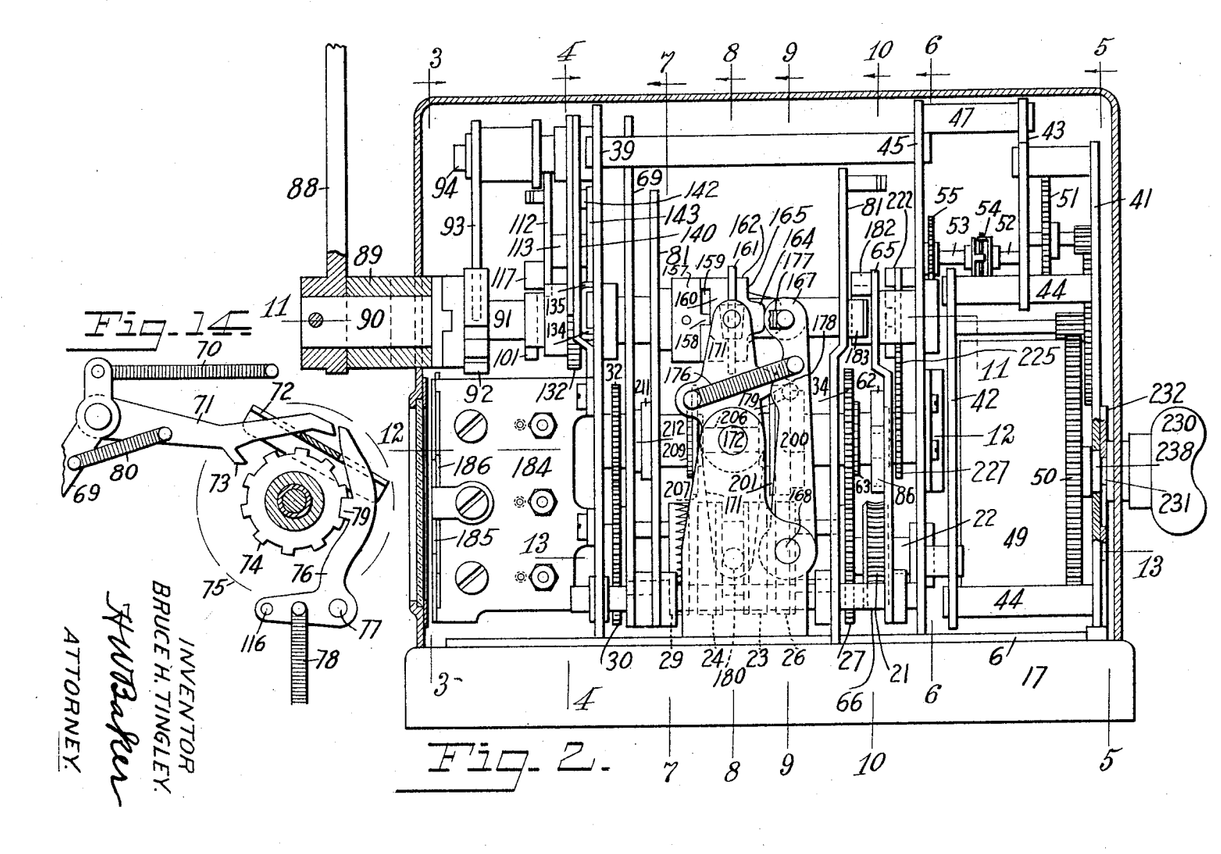
Fig. 2 is a rear elevational view of the taximeter with the casing removed.

The resetting means for the fare drums is best seen in Figs. 1, 2 and 3. The cam 101 engages a roller 117 on the resetting segment 112 when the flag is being moved from its vacant to its first tariff position and rotates the resetting segment so that the segmental gear 118 carried by the resetting segment is in its upper position. The segmental gear 118 meshes with the pinion 119 on a stud shaft 120 extending between the plate 104 and the wall 39. The pinion 119 is rigidly secured to the said shaft 120 and a plate 121 is likewise rigidly secured thereto, which plate carries a spring-pressed pawl 122 which engages a ratchet 123 rotatably mounted on the shaft 120. A gear 124 is rigidly secured to the ratchet 123, which gear 124 meshes with a pinion 125 on a stud shaft 126 and has secured thereto a gear 127 which meshes with a gear 128 secured to the units fare drum 75. The pawl 122 is engaged by a cam 129 on one of the studs 105 when the cam 101 has completed its engagement with the roller 117.

As the flag is rotated from its vacant position to its first tariff position the cam 101 causes the segmental gear 118 to be raised, thereby rotating the pinion 119 and plate 121 carrying the pawl 122, which over-runs the ratchet 123 and causes no movement to the gear 124 nor to the fare drums. When the cam 101 passes out of contact with the roller 117 the pin 111 has passed beyond the end of the lever 109 and the spring 130 rotates the lever 109 clockwise so as to engage the pin 111 and hold the resetting segment 112 in position and the pawl 122 has engaged the cam 129 raising the nose of the pawl out of engagement with the ratchet 123 so that as the fare drums rotate thereby rotating the gears 128, 127, 125 and 124, no movement will be imparted to the resetting segment 112. If the flag is then moved to either its 135° or 180° position, the position of these parts will not be affected for the cam 101 would no longer be in engagement with the roller 117. When, however, the flag is reset to "Hired" position the cam 101 will engage the roller 107 as hereinbefore described and will release the lever 109 from the pin 111, and the spring 131 secured to the resetting segment 112 will lower the segmental gear 118 and rotate the pinion 119 and disk 121, freeing the pawl 122 from the cam 129 so that the pawl engages the ratchet 123, rotating the gear 124, gear 127, pinion 125, and pinion 128, and resetting the fare drums to initial position. Any suitable stop mechanism may be provided so as to stop the fare drums in reset position.

*Full stroke mechanism*

Figures 4, 15:
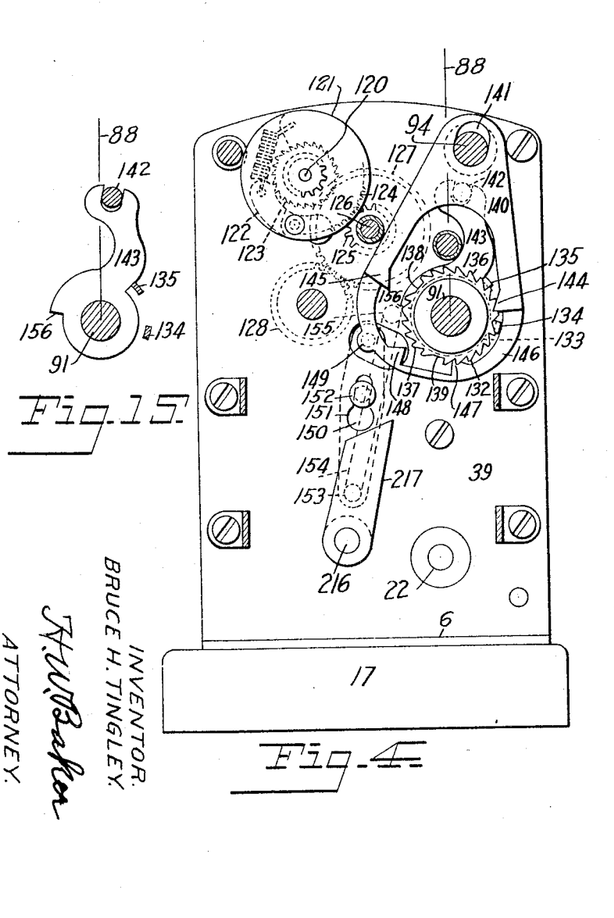
Fig. 4 is an elevational view on the line 4—4 of Fig. 1.
Fig. 15 is a detail view of a part of the full stroke mechanism.
Figure 5:
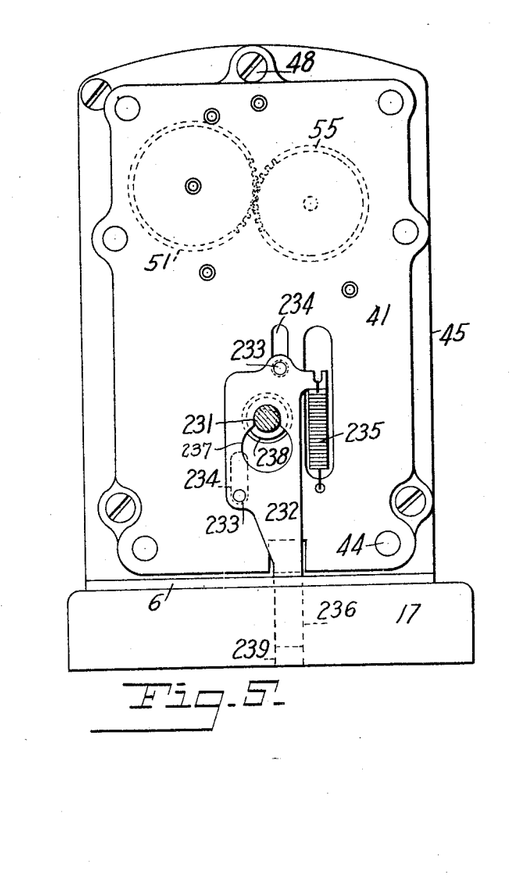
Fig. 5 is an elevational view on the line 5—5 of Fig. 1 looking toward the right.

The full stroke mechanism is best shown in Figs. 4 and 15, the parts being shown in the position in which they would be when the flag is up. The flag shaft 91 has rigidly secured thereto a ratchet 132 and a disk 133 which disk is provided with two lugs 134 and 135. The ratchet 132 is provided with teeth 136 extending for a portion of its circumference in one direction and with teeth 137 extending in the other direction for the remainder of its circumference, there being, however, gaps 138 and 139, in which there are no teeth. A double pawl 140 is mounted on the stud pin 94 and is provided with a slot 141 so that the pawl 140 can have a slight up-and-down movement. The pawl 140 carries a pin 142 which engages a shifting arm 143. It also carries a detent 144 to engage with the teeth 136 and a detent 145 to engage with the teeth 137 of the ratchet 132. The pawl 140 has a yoke-like lower extension 146 surrounding the ratchet 132, which extension is provided with lugs 147 and 148. A pin 149 is carried by the lower part of the extension 146 and said pin projects through a lever 150 provided with a slot 151 in which is received a stud 152 carried by the sidewall 39. The lower end of the lever 150 is provided with a pin 153 to which is secured a spring 154 which is secured to the sidewall 39 by means of a pin 155.

As the flag is lowered from vacent position to first tariff position the detent 144 rides over the teeth 136, but if any attempt was made to return the flag to its upright position, such movement would be prevented. If it is desired to discharge the passenger after the flag has been moved to its first tariff position the flag cannot be directly rotated to "For hire" position but must be moved into its 135° position, at which time the lug 135 would be slightly to the left of the lug 147 and the detent 144 would lie in the gap 138. The flag could now be returned to its vacant position for the lug 135 would engage the lug 147, moving the pawl 140 to the right and shifting the lever 150 so that the pin 153 would be to the left of the line joining the pin 155 with the stud 152, thereby holding the pawl in such position. The detent 144 would thereby be removed from engagement with the teeth 136 and the detent 145 would over-ride the teeth 137. If, after rotating the flag shaft from its 135° position to its 90° position, it should be desired to move it again to its 135° position or its 180° position, this can be done for the lug 134 would be in position to engage the lug 148 and to reversely shift the pawl 140 into the position shown in Fig. 4. If the flag is moved to the 180° position the lug 134 engages a nose 156 of the shifting arm 143 and shifts the pawl 140 so that the flag can be returned to home position. Whenever the lugs 134 or 135 pass the lugs 147 and 148 it is necessary that the pawl 140 should be lowered and this is permitted by means of the slot 141. It is, therefore, apparent that the flag can be reset at either its 135° position or its 180° position and no others. It can, however, be moved from vacant position to first tariff position and to either its 135° or 180° positions then back to first tariff and again into its 135° or 180° positions. This is necessary where the rule is that when there is only one passenger the taximeter should be operated on first tariff and where there are two or more passengers it should be operated on the second tariff. It is frequently the case that a person hires the cab, drives to a party's home and picks up a person there, so that the meter should be operated on first tariff for a portion of the period of employment and on second tariff for the remainder or vice versa.

Clutch shifting mechanism

As before described, the clutch members 23 and 24 can be shifted longitudinally of the shaft 22. The flag shaft 91 has secured thereto a collar 157 which has a tongue 158 which engages a slot 159 in a collar 160, which collar carries a disk 161. A cam 162 is secured to the flag shaft. The cam 162 is provided with a cam surface 163 which extends higher than the cam surface 164, between which extend a depression 165. A roller 166 carried by a lever 167 engages the cam 162 and is pivoted on a pin 168. The disk 161 is provided with two apertures 169 and 170 spaced approximately 90° apart. A lever 171 is pivoted on a shaft 172 extending between standards 173 and 174. The lever 171 carries at its upper part a block 175 which can pass through the appertures 169 and 170, but would normally bear against either the right or the left side of the disk 161. The levers 171 and 167 are connected by means of a spring 176 and a spring 177 attached to the lever 167 tends to pull said lever to the left as viewed in Fig. 2. The lever 171 is provided with a V-shaped ear 178 which bears against a roller 179 carried by the lever 167. The lower portion of the lever 171 is bifurcated and carries rollers 180 which lie between the clutch members 23 and 24.

When the flag is in "For hire" position the roller 166 engages the lower cam surface 164 and the parts are in the position shown in Fig. 2. As the flag is lowered to its first tariff position the collar 157 rotates therewith but the collar 160 does not move for the first 60° of such rotation, there being that much lost motion between the tongue 158 and slot 159. During such 60° rotation the cam surface 164 has passed beyond the roller 166 and the spring 177 causes the roller 179 to engage the ear 178 and move the upper end of the lever 171 to the left, moving the block 175 out of the aperture 169, so that as the disk 161 is picked up the block 175 will be on the left surface thereof and the rollers 180 have engaged the clutch member 23 shifting it into engagement with the clutch member 26 so that the drive from the moving part of the vehicle will be driven through the gear 27. No further action would take place so far as the shifting mechanism is concerned until the flag has reached approximately its 165° position at which time the cam surface 163 would engage the roller 166 shifting the lever 167 to the right and the spring 176 would pull the upper end of the lever 171 with it moving the block 175 through the aperture 170 so that the block would lie on the right hand side of the disk 161. If the flag be now shifted to its 180° position the block 175 would remain on the right hand side of the disk 161. If the flag is returned to its 90° position the block 175 would pass through the slot 170 at approximately the 105° position of the flag. If the flag were again returned to its 180° position the block 175 would lie on the right hand side of the disk 161, but if it were returned to home position it would pass through the slot 170 and lie on the left hand side thereof. The function of the disk 161 is to prevent the possibility of the clutch shifting mechanism being in a neutral position so that the drive from a moving part of the vehicle would not be registered. In the construction shown, the cams tend to move the clutch shifting lever before the block 175 reaches the aperture 169 or 170, and when the aperture is reached it snaps through the aperture to instantly change the clutch member 23 into engagement with the clutch member 26 or the clutch member 24 into engagement with the clutch member 29. This action is almost instantaneous and prevents the parts being in a neutral position.

The flag shaft 91 is provided with a cam 181 which engages a roller 182 on one of the levers 69 and a roller 183 on the lever 65. This engagement only takes place when the flag is in "For hire" position, and the cam thereby disengages the transfer mechanism from the fare drums and holds the lever 65 so that it cannot be operated by the jumping cam 62.

Total counters

A plurality of total counters are mounted in a casing 184. The counters appear through openings in the stationary plate 185 and behind this plate there is a movable plate 186 with similar openings, the two plates being connected by means of a spring 187. Normally the plate or flash 186 is in depressed position so that the openings therein will be out of alignment with the openings in the plate 185 and the counters cannot be read. Any suitable key operating mechanism may be installed whereby the plate 186 is permitted to be raised by an inspector and when so raised the counter 188 is actuated, and therefore registers the number of times that the flash 186 has been operated. The remaining counters with one exception are conventional. The counter 189 indicates the trips, counter 190 indicates the mileage that the machine is operated with the flag in improper position, counter 191 indicates the extras in money, counter 192 indicates the waiting time, counter 193 registers the paid miles, counter 194 registers the total fare and the counter 195 indicates the total miles.

Since the structure to operate these counters is conventional it is not deemed necessary to show or describe the same.

The counter 196 indicates the waiting time while the vehicle is hired. While many different devices might be employed which would accomplish this result the simplest idea appears to incorporate planetary gearing.

It will be remembered that the gear 58 (Fig. 6) is driven by the clock. This gear drives a gear 197 on a shaft 198 mounted in the sidewall 45, which shaft carries a pinion 199 (Fig. 9) which drives a gear 200 on the shaft 33. The gear 200 is secured to a toothed ring 201 which forms an orbit gear with the same pitch diameter as the gear 200. The shaft 33 has a sun gear 202 secured thereto and between the sun gear 202 and the orbit gear 201 are planet gears 203 mounted on pins 204 carried by a disk 205, which disk is secured to a collar 206 rotatably mounted on the shaft 33. The collar 206 has secured thereto a disk 207 carrying pawls 208 which engage a ratchet 209 mounted on a collar 210. A cam 211 is also secured to said collar 210. It will be noted that the gear 199 is the same size as the sun gear 202 and that they rotate in opposite directions. If the vehicle is stationary and is employed the gear 202 is stationary while the gear 199 drives the gear 200 causing the planet gears 203 to travel around the sun gear rotating the disk 205 and driving the cam 211 by means of the disk 207, pawls 208 and ratchet 209. If the vehicle is traveling at such a low rate of speed that the gear 199 is traveling faster than the gear 202 the cam 211 will be similarly driven, but not at the same rate as when the vehicle is standing still. If, for instance, at six miles per hour the road drive and the clock drive move at the same rate then at three miles an hour the gear 202 would be traveling at one-half the velocity of the gear 199 and the disk 205 would travel at one-half the speed that it would have traveled if the vehicle had been standing still. In other words, if the vehicle were driven constantly at the rate of three miles per hour for one hour, the waiting time counter would register one-half hour, for one-half of the charge is for driving and one-half of the charge is for waiting time. In the same way, if the vehicle is driven at any other speed from zero miles per hour to six miles per hour, the paid waiting time counter 196 would register that proportion that should be charged to time consumed while traveling at such a low rate of speed. If the gear 199 is traveling at the same rate of speed as the gear 202, which would ordinarily be about six miles an hour, the planet gears 203 would simply rotate on their axes without rotating the disk 205 and no waiting time would, therefore, be registered. If the gear 202 is traveling faster than the gear 199 the pawls 208 will over-run the teeth of the ratchet 209 without imparting any motion to the cam 211. A holding ratchet 212 may be secured to the cam 211 and retained in position so as to prevent reverse rotation by means of a pawl 213 mounted on a pin 214.

The cam 211 operates an arm 215 mounted on a shaft 216 which carries a crank arm 217 having a beveled extremity which engages a slide 218 carrying a pawl 219 which engages the ratchet 220 of the units disk of the counter 196.

The resetting means for the fare drums has heretofore been described. It is not necessary to reset the shaft 33 but it is necessary to reset the jumping cam 62 thereon. The flag shaft 91 carries a cam 221 which engages a roller 222 mounted on a lever 223 pivoted on a shaft 224, which lever carries a sector gear 225 which meshes with a gear 227 rotatably mounted on the shaft 33 and integral with a ratchet 228. A pawl 229 is carried by the cam 62 and engages the ratchet 228. A lever 240 is mounted on a stud shaft 241 and the upper end is provided with a roller 242 which lies in the path of movement of the cam 245. The lever 240 is provided with a shoulder 243 which, when the flag is in "Vacant" position, engages a lug 244 on the jumping cam 62.

When the flag is in "Vacant" position the parts are as shown in Figs. 10 and 16. As the flag is rotated to first tariff position the cams 221 and 245 engage the rollers 222 and 242, rotating the ratchet 228 in a counter-clockwise direction and shortly thereafter removing the lever 240 out of engagement with the lug 244. This movement of the sector gear 225 imparts no rotation to the cam 62 for the pawl 229 over-runs the teeth of the ratchet 228 and the lug 244 holds the cam against rotation in a clockwise direction as viewed in Fig. 10. By the time the flag shaft has been moved to its first tariff position the spring 226 is under tension and the jumping cam is free of all interference from the resetting mechanism and may be driven by either the clock or a moving part of the vehicle. If the flag should later be moved to its 135° or 180° position, the resetting mechanism would in no wise be affected. When, however, the flag is returned to "Vacant" position the cam 245 passes beyond the roller 242 and permits the lever 240 to move by gravity, or by means of a spring if desired, so that the shoulder 243 is in a position to rotate the lug 244. Immediately thereafter the cam 221 passes beyond the roller 222 and the spring 226 rotates the sector gear 225 and ratchet 228 which engages the pawl 229 and rotates the jumping cam 62 until the lug 244 engages the shoulder 243 which is its reset position.

It is desirable to have the winding key 230 for the clock removable so that the mechanism can be disassembled and at the same time it is desirable to have the key locked into the machine so that it cannot be removed and thrown away or lost. The key 230 is normally attached to the square winding shaft 231 of the clock. A sliding plate 232, which is in effect a locking plate, is provided with pins 233 which extend through slots 234 in the casing, which sliding plate is normally pulled downwardly by means of a spring 235. The sliding plate 232 is spaced a short distance from the outer wall 41. In order to insert the key it is necessary to pass an instrument through the aperture 236 in the base so as to reach the lower end of the sliding plate 232 and raise the same against the tension of the spring 235 so that a circular opening 237 in the sliding plate 232 will be in approximately the position of a circular ring 238 of the same shape carried by the key. This circular ring passes through the opening 237. If the instrument is then removed the spring 235 will move the plate 232 downwardly locking the ring 238 of the key in position so that it cannot be removed unless the plate 232 is again raised. In order to prevent access to the plate 232 I fill the aperture 236 with any suitable means such as a piece of lead 239.

I claim:

1. In a double tariff taximeter, a flag shaft, a cam on said shaft, a lost motion mechanism mounted on said shaft, a driving mechanism, a shifting lever for varying the rate of drive and having two operative positions, and means operatively connecting said lever to said cam and lost motion mechanism whereby said lever is snapped into either of its two operative positions.

2. In a double tariff taximeter, a flag shaft, a cam and a lost motion mechanism mounted on said shaft, a disk having apertures mounted on said lost motion mechanism, a driving mechanism, a shifting lever for varying the rate of drive and having two operative positions, and means whereby the upper end of said lever is caused to be snapped through one of said apertures when the flag is moved from one operative position to another.

3. In a double tariff taximeter. a flag shaft, a cam on said shaft, a lost motion mechanism mounted on said shaft, a shifting lever, means operatively connecting said lever to said cam and lost motion mechanism whereby said lever is snapped into either of its two operative positions, a plurality of gear trains, a driven member, and means whereby said lever connects either of said gear trains to said driven member.

4. In a taximeter, a flag shaft, a ratchet thereon having teeth extending in one direction around a part of its circumference and teeth extending in the opposite direction around the remainder of its circumference, a double-nosed pawl surrounding said ratchet, and means whereby one of said noses is shifted into engagement with one of said sets of teeth when said shaft is shifted to one position and the other of said noses is shifted into engagement with the other set of teeth when said shaft is moved to another position.

In testimony whereof I affix my signature.

BRUCE H. TINGLEY.